(12) United States Patent
Washino et al.

(10) Patent No.: US 8,981,009 B2
(45) Date of Patent: Mar. 17, 2015

(54) FLUORINE-CONTAINING ELASTOMER AND CROSSLINKABLE COMPOSITION COMPRISING SAME

(75) Inventors: Keiko Washino, Settsu (JP); Shigeru Morita, Settsu (JP); Takashi Yoshimura, Settsu (JP); Mitsuru Kishine, Orangeburg, NY (US)

(73) Assignee: Daikin Industries, Ltd., Osaka (JP)

( * ) Notice: Subject to any disclaimer, the term of this patent is extended or adjusted under 35 U.S.C. 154(b) by 321 days.

(21) Appl. No.: 12/934,554

(22) PCT Filed: Mar. 19, 2009

(86) PCT No.: PCT/JP2009/055432
§ 371 (c)(1),
(2), (4) Date: Sep. 24, 2010

(87) PCT Pub. No.: WO2009/119439
PCT Pub. Date: Oct. 1, 2009

(65) Prior Publication Data
US 2011/0021716 A1    Jan. 27, 2011

(30) Foreign Application Priority Data
Mar. 25, 2008   (JP) .................................. 2008-077663

(51) Int. Cl.
*C08F 14/18*   (2006.01)
*C08F 214/18*   (2006.01)
*C08F 214/26*   (2006.01)
*C08K 5/18*   (2006.01)
*C08K 5/29*   (2006.01)
*C08K 5/33*   (2006.01)

(52) U.S. Cl.
CPC ........... *C08F 214/186* (2013.01); *C08F 214/18* (2013.01); *C08F 214/265* (2013.01); *C08K 5/18* (2013.01); *C08K 5/29* (2013.01); *C08K 5/33* (2013.01)
USPC .................. 525/326.2; 525/326.3; 525/326.4; 525/359.1

(58) Field of Classification Search
CPC ............ C08F 214/186; C08F 214/265; C08K 5/1535; C08K 5/18; C08K 5/29; C08K 5/33
USPC ....................... 525/359.1, 326.2, 326.3, 326.4
See application file for complete search history.

(56) References Cited

U.S. PATENT DOCUMENTS

2005/0070637 A1*   3/2005   Nishibayashi et al. ......... 524/80
2008/0227948 A1*   9/2008   Tsuda et al. ................... 528/363

FOREIGN PATENT DOCUMENTS

| JP | 63-289008 A | 11/1988 |
| JP | 04-293950 A | 10/1992 |
| JP | 08-295776 A | 11/1996 |
| JP | 2000-044755 A | 2/2000 |
| JP | 2005-320499 A | 11/2005 |
| WO | 03/051999 A1 | 6/2003 |

* cited by examiner

*Primary Examiner* — Edward Cain
(74) *Attorney, Agent, or Firm* — Sughrue Mion, PLLC

(57) ABSTRACT

The present invention provides a TFE/Pr type elastomer being excellent in not only amine resistance but also heat resistance and chemical resistance and having a small gel content, and a crosslinkable composition comprising the elastomer. The above-mentioned fluorine-containing elastomer is a fluorine-containing elastomer being crosslinkable with the compound (A), comprising 40 to 70% by mole of tetrafluoroethylene unit, 30 to 60% by mole of propylene unit and 0.1 to 2.5% by mole of a carboxyl group-containing vinyl monomer unit and having a Mooney viscosity at 121° C. of 5 to 100.

3 Claims, No Drawings

FLUORINE-CONTAINING ELASTOMER AND CROSSLINKABLE COMPOSITION COMPRISING SAME

TECHNICAL FIELD

The present invention relates to a tetrafluoroethylene (TFE)/propylene (Pr) type elastomer having carboxyl group as a crosslinkable group and to a crosslinkable composition comprising the elastomer.

BACKGROUND ART

Fluorine-containing rubbers are used in the fields of various industries such as automobile industry because of excellent heat resistance and chemical resistance thereof. Fluorine-containing rubbers are classified into perfluoro fluorine-containing rubbers and nonperfluoro fluorine-containing rubbers, and vinylidene fluoride (VdF) type fluorine-containing rubbers and TFE/olefin type fluorine-containing rubbers are used mostly as nonperfluoro fluorine-containing rubbers.

Among these, TFE/Pr type elastomers are known as a TFE/olefin type fluorine-containing rubber, and are used as a sealing material for oil in the fields of automobile and industrial machinery because of excellent resistance especially against amines.

Crosslinking of TFE/Pr type elastomers is carried out by peroxide crosslinking (Patent Document 1) and polyol crosslinking (Patent Document 2), and the former is inferior in heat resistance of the obtained crosslinked rubber and the latter has a problem with crosslinkability and chemical resistance.

Patent Document 1: JP8-295776A
Patent Document 2: JP1-299860A

DISCLOSURE OF INVENTION

Problem to be Solved by the Invention

It is an object of the present invention to provide a TFE/Pr type elastomer being excellent in not only amine resistance but also heat resistance and chemical resistance and having small gel content, and a crosslinkable composition.

Means to Solve the Problem

Namely, the present invention relates to a fluorine-containing elastomer comprising 40 to 70% by mole of tetrafluoroethylene (TFE) unit, 30 to 60% by mole of propylene (Pr) unit, 0.1 to 2.5% by mole of a carboxyl group-containing vinyl monomer unit and if necessary, 0 to 15% by mole of vinylidene fluoride (VdF) and/or 0 to 15% by mole of perfluoro(alkyl vinyl ether) (PAVE), and having a Mooney viscosity at 121° C. of 5 to 100, preferably 20 to 80.

The carboxyl group is present at least in a side chain of the elastomer since it is derived from the copolymerized carboxyl group-containing vinyl monomer.

The TFE/Pr type elastomer of the present invention is obtained by copolymerizing TFE, Pr, a carboxyl group-containing vinyl monomer and if necessary, VdF or PAVE at a polymerization temperature of 10° to 50° C. in the presence of a peroxide and a reducing agent.

The present invention also relates to a crosslinkable composition comprising:
(A) at least one compound selected from the group consisting of a compound having at least two crosslinkable reaction groups represented by the general formula (1):

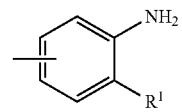

wherein $R^1$s are the same or different and each is $-NH_2$, $-NHR^2$, $-OH$ or $-SH$; $R^2$ is a fluorine atom or a monovalent organic group,
a compound represented by the general formula (2):

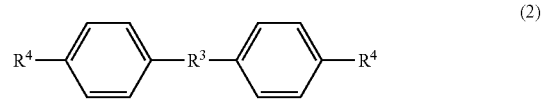

wherein $R^3$ is $-SO_2-$, $-O-$, $-CO-$, an alkylene group having 1 to 6 carbon atoms, a perfluoroalkylene group having 1 to 10 carbon atoms or a single bond; $R^4$ is

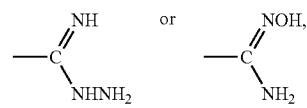

a compound represented by the general formula (3):

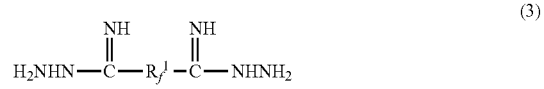

in which $R_f^1$ is a perfluoroalkylene group having 1 to 10 carbon atoms, and a compound represented by the general formula (4):

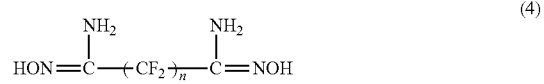

in which n is an integer of 1 to 10, and
(B) the fluorine-containing elastomer of any of claims 1 to 4.

A tetramine crosslinking agent is preferred as the crosslinking agent (A) especially because of its excellent amine resistance.

It is preferable to use a fluorine-containing elastomer obtained by coagulating the fluorine-containing elastomer (TFE/Pr type elastomer) of the present invention with an acid as the fluorine-containing elastomer (B) to be used on the crosslinkable composition of the present invention since viscosity of the fluorine-containing elastomer can be kept low and processability can be improved and also for the purpose of maintaining reactivity of the carboxyl group as a crosslinkable group.

The present invention further relates to a molded article obtained by subjecting the crosslinkable composition of the present invention to imidazole crosslinking.

Effect of the Invention

The present invention provides a TFE/Pr type elastomer being excellent in not only amine resistance but also heat resistance and chemical resistance and having small gel content, and a crosslinkable composition.

BEST MODE FOR CARRYING OUT THE INVENTION

The fluorine-containing elastomer of the present invention comprises 40 to 70% by mole of TFE unit, 30 to 60% by mole of Pr unit, 0.1 to 2.5% by mole of a carboxyl group-containing vinyl monomer unit and if necessary, 0 to 15% by mole of vinylidene fluoride (VdF) and/or 0 to 15% by mole of perfluoro(alkyl vinyl ether) (PAVE).

The TFE unit is contained in an amount of 40 to 70% by mole, preferably 50 to 65% by mole, and elastomeric property is obtained when the TFE unit is contained in the amount mentioned above in combination with Pr.

The Pr unit is contained in an amount of 30 to 60% by mole, preferably 30 to 50% by mole, and elastomeric property is obtained when the Pr unit is contained in the amount mentioned above in combination with TFE.

The carboxyl group-containing vinyl monomer unit is contained in an amount of 0.1 to 2.5% by mole, preferably 0.5 to 2.0% by mole, and a crosslinked structure having good heat resistance and amine resistance is formed when the carboxyl group-containing vinyl monomer unit is contained in the amount mentioned above.

The carboxyl group-containing vinyl monomer is a COOH group-containing monomer having fluorine atom, and examples thereof are $CF_2=CFOCF_2CF(CF_3)OCF_2CF_2COOH$, $CF_2=CFO[CF(CF_3)CF_2O]_2-CF_2CF_2COOH$, $CF_2=CFOCF_2CF_2CF_2OCF_2CF_2COOH$, $CH_2=CH(CF_2)_nCOOH$ (n is an integer of 1 to 5), $CH_2=CFCF_2[OCF(CF_3)CF_2]_mOCF(CF_3)COOH$ (m is 0 or an integer of 1 to 3), and the like.

The amount of the VdF unit and the PAVE unit as optional units is up to 15% by mole, further up to 10% by mole, and the amount exceeding it is not preferred from the viewpoint of amine resistance in the case of the former unit and from the viewpoint of high cost in the case of the latter unit.

A Mooney viscosity (121° C.) of the TFE/Pr type elastomer of the present invention is 5 to 100. When the Mooney viscosity is lower than 5, vulcanizability is lowered and vulcanized rubber does not exhibit sufficient physical properties, and when the Mooney viscosity exceeds 100, flowability is lowered and mold-processability becomes inferior. In both cases, problem to be solved in the present invention cannot be solved. A preferred Mooney viscosity (121° C.) is 10 to 80. Further, a preferred lower limit of Mooney viscosity (121° C.) is 30.

The TFE/Pr type elastomer of the present invention can be prepared by usual emulsion polymerization method, but in this method, a polymerization rate of TFE and Pr is relatively low. Preparation can be carried out efficiently, for example, by the following two-staged polymerization method (seed polymerization method).

The specific two-staged polymerization method (seed polymerization method) comprises:

(I) a step (a step for preparing seeds) for emulsion-polymerizing VdF and hexafluoropropylene (HFP) or VdF, HFP and TFE preferably in the presence of a vinyl group-containing fluorine-containing reactive emulsifying agent and a fluorine-containing ionic emulsifying agent to prepare $1 \times 10^{14}$ or more VdF/HFP copolymer particles or VdF/HFP/TFE copolymer particles per 1 ml of a solution of polymerization product, and (II) a step for emulsion-polymerizing TFE, Pr, a carboxyl group-containing vinyl monomer and if necessary, VdF or PAVE in the presence of $1 \times 10^{14}$ or more VdF/HFP copolymer particles or VdF/HFP/TFE copolymer particles per 1 ml of a polymerization solvent.

It is preferable that the emulsion polymerization of the step (I) for preparation of seeds is initiated by using a water soluble radical polymerization initiator. Known water soluble radical polymerization initiators can be used. Examples thereof are ammonium persulfate (APS), potassium persulfate (KPS), sodium persulfate and the like, and from the viewpoint of good ability of generating ionic end groups, APS and KPS can be used suitably.

In addition, it is possible to use a low temperature decomposition type initiator system using redox reaction by adding a reducing agent to the above-mentioned initiator according to necessity. Examples of a preferred reducing agent are sulfites such as sodium sulfite, metabisulfites such as sodium hydrogensulfite and potassium hydrogensulfite, pyrosulfates and thiosulfates. When a sulfite is used, there is a case that ionic end group is $SO_3$.

The amount of polymerization initiator is preferably 5 to 5,000 ppm, further preferably 20 to 500 ppm, based on the amount of water to be used for the polymerization.

A polymerization temperature is one recommended for the water soluble radical polymerization initiator to be used and is selected within a range from 0° C. to 130° C. Especially, when a redox type polymerization initiator to be used together with a reducing agent is used, it is preferable that a polymerization temperature is not less than 0° C., preferably 10° C. to 50° C.

The polymerization pressure for the emulsion polymerization varies depending on vaporization pressure of the monomers to be used, and is optionally selected according to such conditions. The polymerization pressure is preferably from a reduced pressure to 15 MPa, further preferably from 0.5 to 8 MPa.

In the step (I) for preparation of seeds, it is preferable to carry out the emulsion polymerization in the presence of a vinyl group-containing fluorine-containing reactive emulsifying agent and a fluorine-containing ionic emulsifying agent from the viewpoint that the number of particles can be increased stably.

Examples of a vinyl group-containing fluorine-containing reactive emulsifying agent which can be suitably used are quaternary ammonium salts of carboxylic acids having fluorine-containing allyl ether chain, and especially compounds represented by the formula (1):

wherein n1 is 0 or an integer of 1 to 10; n2 is 0 or an integer of 1 to 10, are preferred from the viewpoint of a large effect of increasing the number of seed particles.

With respect to the fluorine-containing ionic emulsifying agent to be used in the step (I), preferred are, for example, compounds represented by the formula (2):

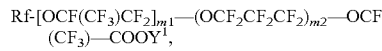

wherein Rf is a perfluoroalkyl group having 1 to 6 carbon atoms; $Y^1$ is H, $-NH_4$ or an alkali metal atom; m1 is 0 or an integer of 1 to 4; m2 is 0 or an integer of 1 to 4,
from the viewpoint of good effect of stabilizing particles and good solubility in water.

The number of seed particles per 1 ml of a solution of polymerization product is preferably not less than $1 \times 10^{14}$, further preferably not less than $1 \times 10^{15}$. An upper limit is about $2 \times 10^{16}$.

In the following step (II) for copolymerizing TFE, Pr and the carboxyl group-containing vinyl monomer, emulsion polymerization of TFE and Pr is carried out in the presence of seed particles prepared in the step (I) by using a radical polymerization initiator by adding an emulsifying agent or by adding no emulsifying agent. It is preferable that when starting the step (II), the number of seed particles per 1 ml of a polymerization solvent is not less than $1 \times 10^{14}$.

The purpose of this step (II) is to prepare a high molecular weight copolymer of TFE, Pr and the carboxyl group-containing vinyl monomer by emulsion polymerization, and therefore, it is desirable that the amount of polymerization initiator to be used in the step (II) is as small as 0.01 to 0.5% by mass, especially 0.05 to 0.2% by mass.

Also, it is preferable to carry out the polymerization at a polymerization temperature within a range from 10° C. to 50° C. especially by using a redox type polymerization initiator to be used together with a reducing agent, from the viewpoint of good processability of the obtained TFE/Pr type elastomer.

In the present invention, a method of separating (collecting) a TFE/Pr type elastomer from a solution of reaction product after the polymerization is not limited particularly, and separation by coagulation with an acid is preferred since viscosity of the fluorine-containing elastomer can be kept low, processability of the elastomer can be improved and reactivity of the carboxyl group as a crosslinkable group is maintained.

Preferred examples of an acid to be used for coagulation are inorganic acids such as hydrochloric acid and nitric acid.

Meanwhile, TFE/Pr type elastomers having cyano (CN) group as a crosslinkable group are known, but cyano group is easily decomposed in the above-mentioned polymerization step, in this acid coagulation step and further in the following drying step, and as a result, sufficient cure site cannot be provided and in some cases, there arises a problem with heat resistance.

The crosslinkable composition of the present invention can be prepared by blending a specific crosslinking agent to the thus-separated TFE/Pr type elastomer.

Namely, the crosslinkable composition of the present invention comprises:

(A) at least one compound selected from the group consisting of a compound having at least two crosslinkable reaction groups represented by the general formula (1):

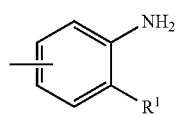
(1)

wherein $R^1$s are the same or different and each is —$NH_2$, —$NHR^2$, —OH or —SH; $R^2$ is a fluorine atom or a monovalent organic group, a compound represented by the general formula (2):

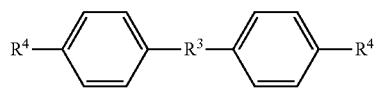
(2)

wherein $R^3$ is —$SO_2$—, —O—, —CO—, an alkylene group having 1 to 6 carbon atoms, a perfluoroalkylene group having 1 to 10 carbon atoms or a single bond; $R^4$ is

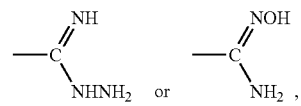

a compound represented by the general formula (3):

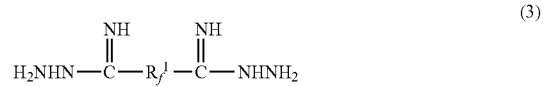
(3)

in which $R_f^1$ is a perfluoroalkylene group having 1 to 10 carbon atoms, and a compound represented by the general formula (4):

(4)

in which n is an integer of 1 to 10, and (B) the fluorine-containing (TFE/Pr type) elastomer of the present invention.

The number of crosslinkable reaction groups represented by the formula (1) in the crosslinking agent (A) is preferably at least one, more preferably 2 to 4, further preferably 2.

The number of crosslinkable reaction groups represented by the formula (1) may be one, but in such a case, crosslinking reaction of the elastomer becomes possible when the elastomer contains at least one other crosslinkable reaction group. In this case, an optional group is selected as the other crosslinkable reaction group, and from the viewpoint of heat resistance, especially a crosslinkable reaction group having two or more amino groups is preferred. However, since the crosslinkable reaction group represented by the formula (1) has high heat resistance, it is preferable that crosslinkable reaction groups comprise only the groups represented by the formula (1).

In the formula (1), $R^1$ is —$NH_2$, —$NHR^2$, —OH or —SH, and $R^2$ is a fluorine atom or a monovalent organic group.

The monovalent organic group is not limited particularly, and examples thereof are an aliphatic hydrocarbon group, a phenyl group and a benzyl group. Specifically, there are, for example, lower alkyl groups having 1 to 10, particularly 1 to 6 carbon atoms such as —$CH_3$, —$C_2H_5$ and —$C_3H_7$; fluorine atom-containing lower alkyl groups having 1 to 10, particularly 1 to 6 carbon groups such as —$CF_3$, —$C_2F_5$, —$CH_2F$, —$CH_2CF_3$ and —$CH_2C_2F_5$; a phenyl group; a benzyl group; a phenyl group or a benzyl group, in which 1 to 5 hydrogen atoms are substituted by —$CF_3$ fluorine atoms such as —$C_6F_{5-n}(CF_3)_n$ and —$CH_2C_6F_5$; or a phenyl group or a benzyl group, in which 1 to 5 hydrogen atoms are substituted by —$CF_3$ such as —$C_6H_{5-n}(CF_3)_n$ and —$CH_2C_6H_{5-n}(CF_3)_n$ where n is an integer of 1 to 5. Among these, OH is preferred as $R^1$ from the viewpoint of good crosslinkability. Also, from the viewpoint of chemical resistance, —$NH_2$ and —$NHR^2$ ($R^2$ is a monovalent organic group) are preferred.

Examples of the monovalent organic group are as mentioned above. Among those, phenyl group and —$CH_3$ are preferred from the viewpoint of especially excellent heat resistance and further relatively easy synthesis, and hydrogen atom is preferred from the viewpoint of good crosslinkability.

From the viewpoint of easy synthesis, preferable as the compound having two crosslinkable reaction groups represented by the formula (1) are compounds represented by the formula (5):

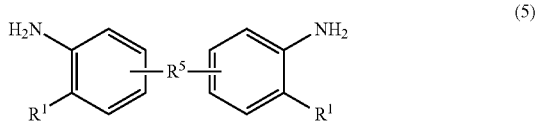

(5)

wherein $R^1$ is as defined above, $R^5$ is —$SO_2$—, —O—, —CO—, an alkylene group having 1 to 6 carbon atoms, a perfluoroalkylene group having 1 to 10 carbon atoms, a single bond or a group represented by:

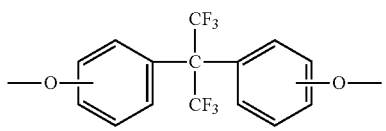

Preferable examples of alkylene groups having 1 to 6 carbon atoms are methylene, ethylene, propylene, butylene, pentylene, hexylene and the like, and examples of perfluoroalkylene groups having 1 to 10 carbon atoms are

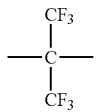

and the like.

Among these crosslinking agents (A), from the viewpoint of excellent heat resistance and good crosslinkability, preferred are compounds having symmetric structure, more preferred are compounds having at least two crosslinkable reaction groups represented by the formula (1), and more preferred are compounds represented by the formula (5), and from the viewpoint of excellent long-term heat resistance and especially good oxazole-crosslinkability, further preferred are 2,2-bis(3-amino-4-hydroxyphenyl)hexafluoropropane (general term: bisaminophenol AF) and 3,3'-bishydroxybenzidine.

Also, examples of preferred tetramine crosslinking agent having $NH_2$ as $R^1$ are compounds having four amino groups and represented by the formula (6):

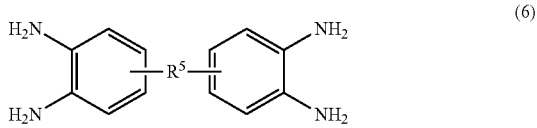

(6)

from the viewpoint of easy synthesis.

In the compounds represented by the formula (6), $R^5$ is as defined above.

These $R^5$s are known as examples in bisdiaminophenyl compounds of JP2-59177B, JP8-120146A, etc.

$R^5$ may be bonded to any positions of the right and left benzene rings, and from the viewpoint that synthesis is easy and crosslinking reaction proceeds easily, it is preferable that $R^5$ is bonded so that $NH_2$ groups are para-positioned.

Preferred tetramine crosslinking agent is a compound represented by the formula (7):

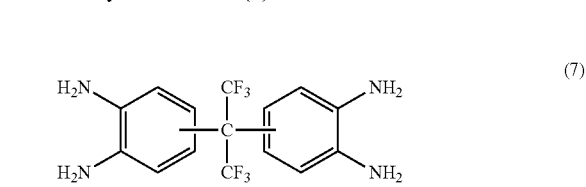

(7)

Non-limiting examples thereof are 2,2-bis-[3-amino-4-(N-methylamino)phenyl]hexafluoropropane, 2,2-bis-[3-amino-4-(N-ethylamino)phenyl]hexafluoropropane, 2,2-bis-[3-amino-4-(N-propylamino)phenyl]hexafluoropropane, 2,2-bis-[3-amino-4-(N-phenylamino)phenyl]hexafluoropropane, 2,2-bis-[3-amino-4-(N-perfluorophenylamino)phenyl]hexafluoropropane, 2,2-bis-[3-amino-4-(N-benzylamino)phenyl]hexafluoropropane, and the like.

Among these crosslinking agents (A), tetramine crosslinking agents form a rigid imidazole crosslinking ring, are excellent in amine resistance, heat resistance, chemical resistance and mechanical strength, and provides a crosslinked article having especially well-balanced heat resistance and amine resistance.

The amount of crosslinking agent (A) is preferably 0.1 to 10 parts by mass, more preferably 0.5 to 5 parts by mass based on 100 parts by mass of the TFE/Pr type elastomer. When the amount of crosslinking agent (A) is less than 0.1 part by mass, there is a tendency that sufficient mechanical strength, heat resistance and chemical resistance for practical use cannot be obtained, and when the amount exceeds 10 parts by mass, there is a tendency that crosslinking does not proceed well.

In the present invention, an inorganic substance can be blended as a crosslinking accelerator.

Preferable examples of an inorganic substance which can be used as a crosslinking accelerator are inorganic oxides, inorganic nitrides and carbon materials. Among them, compounds having adsorptivity of water and alcohol and compounds having a base site are more preferable.

Examples of compounds having adsorptivity of water and alcohol are, for instance, molecular sieves, magnesium sulfate, sodium sulfate, activated carbon and mesoporous silica. Among these, molecular sieves are especially preferred from the viewpoint of improvement in crosslinking speed and compression set.

Examples of compounds having a base site are (1) alkali metal, alkali earth metal and oxides thereof, (2) silica, alumina, carbon and activated carbon which have an alkali metal, alkali earth metal or oxide thereof, (3) inorganic nitrides such as silicon nitride ($Si_3N_4$) and AlN, and (4) silica, alumina, carbon and activated carbon having amine functional group on their surfaces. Among these, (2) silica, alumina, carbon and activated carbon which contain an alkali metal, alkali earth metal or oxide thereof, (3) inorganic nitrides such as silicon nitride ($Si_3N_4$) and AlN, and (4) silica, alumina, carbon and activated carbon having amine functional group on their surfaces are preferred more, and (3) inorganic nitrides such as silicon nitride ($Si_3N_4$) and AlN are especially preferred.

Also, silica, alumina and carbon carrying those compounds thereon can be used suitably.

Examples thereof are magnesium oxide, aluminum oxide, sodium oxide, zinc oxide, hydrotalcite, Zonolite, Wallastonite, talc, ATTAPULGITE, bentonite, zeolite, clay, pyrophyllite, and Selenite. Examples of these compounds are CARPLEX #1120 (available from Degussa Japan), CARPLEX #100 (available from Degussa Japan), TOKUSIL Gu (available from TOKUYAMA Corporation), Nipseal ER (available from Nippon Silica Industrial Co., Ltd.), Nipseal NA (available from Nippon Silica Industrial Co., Ltd.) and Nipseal g300 (available from Nippon Silica Industrial Co., Ltd.).

The amount of inorganic substance used as a crosslinking accelerator is preferably not less than 0.1 part by mass, more preferably not less than 0.5 part by mass, further preferably not less than 1 part by mass, especially preferably not less than 5 parts by mass based on 100 parts by mass of the fluorine-containing elastomer. An upper limit of the amount of inorganic substance is preferably not more than 50 parts by mass, more preferably not more than 30 parts by mass. When the amount of inorganic substance is less than 0.1 part by mass, there is a tendency that a sufficient effect of adding the inorganic substance cannot be obtained, and when the amount of inorganic substance exceeds 50 parts by mass, there is a tendency that hardness becomes high, and moldability is inferior.

In the case of the use in the fields where high purity and non-staining property are not required, to the crosslinkable composition of the present invention can be blended, according to necessity, usual additives to be blended to fluorine-containing elastomer compositions, for example, filler, processing aid, plasticizer, colorant, stabilizer and adhesion aid. Also, one or more usual crosslinking agent and crosslinking aid being different from those mentioned above may be added to the composition.

Examples of the filler are carbon black, talc, silicic acid, silicic acid compound, calcium carbonate, barium sulfate, clay, high styrene resin, phenol resin, and cumaron resin. Among them, examples of carbon black used generally are thermal black, bituminous coal filler, furnace black and channel black. From the viewpoint of compression set, bituminous coal filler is preferable, and from the viewpoint of dynamical physical properties, a mixture of bituminous coal filler and thermal black is preferable.

An amount of filler is preferably 10 to 50 parts by mass, more preferably 15 to 45 parts by mass based on 100 parts by mass of the fluorine-containing elastomer.

When the mixture of bituminous coal filler and thermal black is used, its weight ratio (bituminous coal filler/thermal black) is preferably 9/95 to 80/20, more preferably 30/70 to 70/30. When the ratio is beyond the above-mentioned range, deterioration of compression set and lowering of pressing crack resistance are found.

The composition of the present invention can be prepared by mixing the above-mentioned components by using usual elastomer processing machine, for example, an open roll, a Banbury mixer or a kneader. In addition, the composition can be prepared also by a method of using an internal mixer.

A Mooney viscosity (121° C.) of the crosslinkable composition of the present invention is preferably 10 to 120. When the Mooney viscosity (121° C.) is lower than 10, there is a tendency that vulcanization is insufficient and physical properties of the vulcanized article become insufficient, and when the Mooney viscosity exceeds 120, there is a tendency that flowability is lowered and moldability becomes inferior. In that case, a molded article cannot be obtained in some cases. A further preferred Mooney viscosity (121° C.) is 30 to 80.

For producing a crosslinked molded article from the above-mentioned composition, usual known methods may be employed, such as a method of heating and compressing in a metal mold, a method of putting in a heated metal mold under pressure and a method of extruding with an extruder. In the cases of extruded products such as a hose and an electric wire, a crosslinked molded article can be obtained by heating for crosslinking with steam.

In the present invention, crosslinking conditions are not limited particularly, and the crosslinking can be carried out under usual crosslinking conditions for fluorine-containing elastomers. In any cases of using the crosslinking agents mentioned above, a crosslinked article exhibiting good sealing property can be obtained by charging the crosslinkable composition in a metal mold, carrying out press-crosslinking by holding under pressure at 120° to 250° C. (preferably 180° to 250° C.) for 1 to 120 minutes, and then carrying out oven-crosslinking by holding in an oven of 160° to 320° C. (preferably 200° to 320° C., more preferably 230° to 300° C.) for 0 to 48 hours (preferably 2 to 48 hours).

A crosslinked fluorine-containing elastomer layer obtained by crosslinking the crosslinkable composition of the present invention may be laminated with a non-fluorine-containing elastomer layer formed from a non-fluorine-containing elastomer composition to give a laminated rubber article. This laminated article is useful for a hose as a laminated article having amine resistance, heat resistance, oil resistance and cold resistance.

The molded article of the present invention is useful as various molded articles used in a variety of fields, and is useful as various molded articles used in the fields mentioned below, especially as materials for hoses to be used around engines of transportation equipment (automobiles, etc.) and exposed to high temperature environment. Examples of such hoses are turbo-charger hose and inter cooler hose.

Preferable examples of fields other than application to automobiles are semiconductor-related fields such as semiconductor manufacturing equipment, liquid crystal panel manufacturing apparatuses, plasma panel manufacturing apparatuses, plasma addressed liquid crystal panels, field-emission display panels, and solar cell boards, and the fields of aircraft, rocket, marine vessel, chemical products in chemical plants, medicals such as pharmaceuticals, photograph such as developing machine, printing such as printing machine, painting such as painting equipment, equipment in food plants, equipment in atomic power plants, iron and steel industry such as steel sheet processing equipment, general industry, fuel cells, electronic parts and oil field excavator.

EXAMPLE

The present invention is explained by means of examples, however, the present invention is not limited thereto.

Measuring methods and evaluation methods employed herein are explained as follows.

(1) Average Particle Size
Measuring equipment: Microtrac UPA available from HONEYWELL
Measuring method: Dynamic light scattering method
A sample is made by diluting 0.05 ml of emulsion to be measured with 8 ml of pure water, and measuring is carried out at room temperature. An average particle size is calculated by taking an average of the obtained data.

(2) Number of Particles
Method of calculation: The number of particles is calculated from the average particle size obtained in (1) above and a solid content, assuming a specific gravity of a polymer to be 1.55.

(3) Elemental Analysis
Measuring equipment: Fluorine-ion selective electrode, THERUMO Orion 720A Measuring method: About 1.5 mg of a sample is burnt in oxygen gas to be absorbed in 10 ml of pure water and then the solution is made neutral with a buffer solution. Measurement is carried out with a fluorine-ion selective electrode.

(4) Glass Transition Temperature Tg

Measuring equipment: DSC822e available from METLER TOLEDO

Measuring method: About 10 mg of a sample is set on a measuring plate and heated from −50° C. to 150° C. at a temperature elevating rate of 10° C. per minute, and heat absorption is recorded. A tangent line is drawn on the points of change in specific heat, and a center point of the line is assumed to be Tg.

(5) Mooney Viscosity (121° C.)

Measuring equipment: MOONEY MV 2000E available from ALPHA TECHNOLOGIES

Measuring method: Equipment is set at 121° C. and about 35 g of a measuring sample is clamped with L-rotors. After one minute preheating, measurement is started and a viscosity value is taken 11 minutes after (10 minutes after starting of the measurement).

Example 1

Step (I)

Into a 3-liter stainless steel autoclave provided with a stirrer were poured 1,530 ml of pure water, 0.153 g of $CH_2=CFCF_2OCF(CF_3)CF_2OCF(CF_3)COONH_4$ and 3.06 g of $CF_3CF_2CF_2OCF(CF_3)CF_2OCF(CF_3)COONH_4$, and after evacuation of a system, the inside of the system was sufficiently replaced with nitrogen gas and further with HFP. 0.04 ml of isopentane and HFP were charged at the inside temperature of the system of 80° C. and a pressurized monomer mixture of VdF/HFP (=65/35 mole %) was introduced with stirring at 600 rpm so that the inside pressure of the system became 1.5 MPa. Then, a solution of polymerization initiator prepared by dissolving 0.1 g of APS in 5 ml of pure water was introduced with pressurized nitrogen gas to initiate a reaction.

As the polymerization proceeded, when the inside pressure is decreased to 1.45 MPa, a pressurized monomer mixture of VdF/HFP (=78/22 mole %) was introduced until the inside pressure reached 1.5 MPa. Thereafter, as the polymerization proceeded, the pressurized monomer mixture was introduced three times in the same manner as above. Lastly, when the inside pressure is decreased to 1.50 MPa, the remaining gas was discharged to terminate the polymerization. Subsequently, the temperature inside the system was increased to 90° C. to decompose the remaining APS.

The obtained solution of polymerization product was 1,577 g, and $7.6\times10^{14}$ particles (average particle size: 0.028 μm) of VdF/HFP copolymer were contained per 1 ml of the solution (solid content: 1.5% by mass).

A pH value of this solution of polymerization product was 4, and the pH value was adjusted to be 7 by adding an aqueous solution of sodium hydroxide thereto.

Step (II)

Into a 3-liter stainless steel autoclave provided with a stirrer were poured 765 g of the pH-adjusted dispersion obtained in the step (I) (containing $7.6\times10^{14}$ particles of VdF/HFP copolymer per 1 ml of the polymerization solvent), 0.765 g of $CH_2=CFCF_2OCF(CF_3)CF_2OCF(CF_3)COONH_4$, 1.53 g of $CF_3CF_2CF_2OCF(CF_3)CF_2OCF(CF_3)COONH_4$ and 20 g of sodium sulfite, and after evacuation of a system, the inside of the system was sufficiently replaced with nitrogen gas. A pressurized monomer mixture of TFE/Pr (=50.1/49.9 mole %) was introduced at 15° C. with stirring at 600 rpm so that the inside pressure of the system became 2.2 MPa. Then, a solution of polymerization initiator prepared by dissolving 0.5 g of APS in 5 ml of pure water was introduced with pressurized nitrogen gas to initiate a reaction.

As the polymerization proceeded, when the inside pressure is decreased to 2.05 MPa, a pressurized monomer mixture of TFE/Pr (=50.1/49.9 mole %) was introduced until the inside pressure reached 2.2 MPa. Thereafter, as the polymerization proceeded, the pressurized monomer mixture was introduced in the same manner as above, and a solution of APS dissolved in pure water was optionally added to proceed with the polymerization. During the polymerization, 0.96 g of $CF_2=CFOCF_2CF(CF_3)OCF_2CF_2COOH(CBVE)$ and 4 ml of pure water were added 18 times. Also, 1.6 g of pressurized diethyl malonate was added five times. 299 minutes after starting of the polymerization (amount of additional monomer mixture: 250 g), the remaining gas was discharged to terminate the polymerization. The total amount of the charged APS was 1.6 g.

The obtained solution of polymerization product was 2,109 g, and $1.8\times10^{14}$ particles of TFE/Pr/CBVE copolymer (TFE/Pr/CBVE=54.7/44.7/0.6 mole %, average particle size: 0.102 μm, fluorine content: 60.7% by mass, glass transition temperature Tg: 4° C.) were contained per 1 ml of the polymerization solvent (water) (pH: 7, solid content: 16.6% by mass).

The solution of polymerization product obtained in the step (II) was subjected to coagulation with 10% sulfuric acid to obtain a TFE/Pr/CBVE copolymer which was then washed with pure water and dried in a hot air dryer at 80° C. for eight hours and then at 120° C. for hours. The Mooney viscosity (121° C.) of the obtained TFE/Pr/CBVE copolymer was 75.

Example 2

Step (I)

765 g of the solution of polymerization product obtained in the step (I) of Example 1 and containing the VdF/HFP copolymer particles was used in the same manner as in Example 1.

Step (II)

Polymerization was carried out in the same manner as in the step (II) of Example 1 except that during the polymerization of TFE and Pr, 1.8 g of pressurized diethyl malonate was added five times and 3.74 g of CBVE was added 18 times. When the amount of additional monomer mixture reached 231 g 323 minutes after starting of the polymerization, the remaining gas was discharged to terminate the polymerization.

The obtained solution of polymerization product was 2,110 g, and $1.6\times10^{14}$ particles of TFE/Pr/CBVE copolymer (TFE/Pr/CBVE=54.6/44.1/1.3 mole %, average particle size: 0.112 μm, fluorine content: 60.7% by mass, glass transition temperature Tg: 4° C.) were contained per 1 ml of the polymerization solvent (water) (pH: 7, solid content: 16.6% by mass).

The solution of polymerization product obtained in the step (II) was subjected to coagulation with 10% nitric acid to obtain a TFE/Pr/CBVE copolymer which was then washed with pure water and dried in a hot air dryer at 80° C. for eight hours and then at 120° C. for twelve hours. The Mooney viscosity (121° C.) of the obtained TFE/Pr/CBVE copolymer was 41.

Example 3

In an open roll, 100 parts by mass of the TFE/Pr/CBVE copolymer obtained in Example 1 was kneaded with 20 parts by mass of N990 (Thermax MT (available from Cancarb Co., Ltd.)) as carbon black and 1.75 parts by mass of 2,2-bis(3,4-diaminophenyl)hexafluoropropane (crosslinking agent TA-AF) as a tetramine crosslinking agent to obtain a composition for crosslinking. As a result of evaluation of vulcanization characteristics of this composition, an induction time ($T_{10}$) was 3.0 minutes, and an optimum vulcanization time ($T_{90}$) was 30 minutes.

The above-mentioned composition was subjected to press-crosslinking (imidazole crosslinking) at 200° C. for 45 minutes and then post-crosslinking at 200° C. for four hours, at 260° C. for five hours, and then at 290° C. for eighteen hours to obtain a crosslinked sheet and an O-ring (AS-568A-214). As a result of evaluation of mechanical properties of the obtained crosslinked sheet, 100% modulus was 5.7 MPa, tensile strength at break was 21.6 MPa and tensile elongation at break was 240%, and it was fount that the sheet was one being excellent in mechanical properties. In addition, compression set of the O-ring was evaluated. The compression set after a 70-hour test at 260° C. was 89%.

In order to evaluate amine resistance, strength characteristics after dipping in ethylene diamine at room temperature for one hour were measured, and as a result, 100% modulus was 3.9 MPa, tensile strength at break was 23.7 MPa and tensile elongation at break was 305%, and there was no deterioration at all.

<Vulcanization Characteristics>

When vulcanizing the composition of TFE/Pr copolymer prepared in Examples, a vulcanization curve at 200° C. was obtained with a JSR type Curastometer of model V, and an induction time ($T_{10}$) and an optimum vulcanization time ($T_{90}$) were obtained.

<Mechanical Properties>

The composition of TFE/Pr copolymer for vulcanization prepared in Examples was subjected to compression and molding with a hot press to make a 2 mm thick sheet, and according to JIS-K6251, 100% modulus, tensile strength at break and tensile elongation at break were measured. The test piece is in the form of dumbbell No. 4.

<Amine Resistance>

After dipping in ethylene diamine at room temperature for one hour, strength characteristics were evaluated.

Example 4

A crosslinkable composition was prepared in the same manner as in Example 3 except that 1.75 parts by mass of 2,2-bis(3-amino-4-hydroxyphenyl)hexafluoropropane (general term: Bisaminophenol AF) was used as an oxazole crosslinking agent, and vulcanization characteristics were evaluated. An induction time ($T_{10}$) was 5.0 minutes, and an optimum vulcanization time ($T_{90}$) was 42.0 minutes.

After carrying out press-crosslinking and post-crosslinking in the same manner as in Example 3, mechanical properties were evaluated. 100% modulus was 3.0 MPa, tensile strength at break was 16.7 MPa and tensile elongation at break was 350%, and it was fount that mechanical properties were satisfactory. In addition, compression set of the O-ring was evaluated. The compression set after a 70-hour test at 260° C. was 97%.

Example 5

A crosslinkable composition was prepared in the same manner as in Example 3 except that the TFE/Pr/CBVE copolymer obtained in Example 2 and 3.8 parts by mass of a crosslinking agent TA-AF were used, and vulcanization characteristics were evaluated. An induction time ($T_{10}$) was 3.2 minutes, and an optimum vulcanization time ($T_{90}$) was 36 minutes.

After carrying out press-crosslinking and post-crosslinking in the same manner as in Example 3, mechanical properties were evaluated. 100% modulus was 7.3 MPa, tensile strength at break was 19.8 MPa and tensile elongation at break was 170%, and it was fount that mechanical properties were satisfactory.

The invention claimed is:

1. A fluorine-containing elastomer composition comprising
   (A) at least one compound selected from the group consisting of a compound having at least two crosslinkable reaction groups represented by the formula (1):

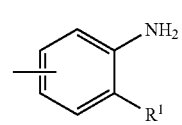

(1)

wherein $R^1$s are the same or different and each is —$NH_2$, —$NHR^2$, —OH or —SH; $R^2$ is a fluorine atom or a monovalent organic group,
   and the compound (A) is a tetramine crosslinking agent or $R^1$ is —OH, and
   (B) a fluorine-containing elastomer which is crosslinkable with the compound (A), comprises 40 to 70% by mole of tetrafluoroethylene unit, 30 to 60% by mole of propylene unit and 0.6 to 1.3% by mole of a carboxyl group-containing vinyl monomer unit and has a Mooney viscosity at 121° C. of 5 to 100.

2. The crosslinkable composition of claim 1, wherein the fluorine-containing elastomer (B) is a fluorine-containing elastomer obtained by coagulating a fluorine-containing elastomer comprising 40 to 70% by mole of tetrafluoroethylene unit, 30 to 60% by mole of propylene unit and 0.6 to 1.3% by mole of a carboxyl group-containing vinyl monomer unit and having a Mooney viscosity at 121° C. of 5 to 100 with an acid.

3. A molded article obtained by subjecting the crosslinkable composition of claim 1 to imidazole crosslinking.

* * * * *